Patented Oct. 19, 1948

2,452,000

UNITED STATES PATENT OFFICE 2,452,000

PROCESS FOR THE RECOVERY OF ENZYMES FROM AQUEOUS SOLUTIONS AND PRODUCT OBTAINED THEREBY

James S. Wallerstein and Ralph Thomas Alba, New York, N. Y., assignors, by mesne assignments, to Wallerstein Company, Inc., New York, N. Y., a corporation of New York No Drawing. Application March 24, 1945, Serial No. 584,732

11 Claims. (Cl. 195—63)

This invention relates to the removal of enzymes from aqueous solutions or suspensions, and more particularly to their removal in the form of a more or less insoluble complex with lignin, and to the complex so formed. It is the general object of the invention to provide an improved method for the separation, concentration, and recovery of enzymes from solutions or suspensions thereof, whereby not only is a high rate of recovery obtained, but the enzymes are recovered in an active form.

More specifically it is an object of the invention to provide a method for the concentration and recovery of enzymes from aqueous solutions or suspensions with the aid of inexpensive reagents which do not interfere with the activity of the enzymes nor contaminate them with substances deleterious to their activity or to the materials or processes with which they are subsequently to be employed.

At present, enzymes are used for a variety of industrial purposes as, for example, the desizing of starch (amylase) or the dehairing of leather (proteases). They are derived from animal or plant sources or may be produced by growing certain types of microorganisms on suitable media from which the enzymes are extracted and precipitated. Thus, for example, the mould *Aspergillus oryzae* may be grown on moistened bran, forming a substantial quantity of diastatic enzyme which may be extracted with water. Strains of Aspergillus may be adapted to the production of a tryptic protease extractable in water preferably by prolonged shaking in the presence of toluol or other substance which will speed rupturing of the cells and freeing of the enzymes into the solution.

It is well known that such enzymes may be precipitated from solution and thus removed and recovered by the addition of large quantities of salts as, for example, by forming a saturated solution of sodium or ammonium sulfate. They may also be precipitated by the addition of various organic solvents, as, for example, propyl or amyl alcohol in a ratio severalfold that of the water present.

These methods of separation, while yielding satisfactory recoveries of enzymes, require the use of rather expensive materials and somewhat cumbersome operations. In the case of precipitation of the enzymes with organic solvents, the process becomes commercially prohibitive because of the cost of the solvent unless a high degree of recovery of the solvent is provided for; such recovery, however, requires elaborate equipment with additional outlays in fuel, labor, etc. Where precipitation with the aid of salts is resorted to, the cost of the process is considerably increased by the large quantities of salt required: moreover, the presence of the salt may be undesirable for certain uses of the enzyme, so that further purification, as by means of organic liquids, must frequently be resorted to.

According to the present invention an efficient concentration and recovery of enzymes from aqueous solutions and suspensions is obtained by combining the enzyme with a lignin which forms an enzyme-lignin complex which is soluble at the pH range at which the enzyme is active, but is insoluble at lower pH values. The present invention accordingly contemplates the precipitation of enzymes by the addition of alkali-soluble but acid-insoluble lignin, the lignin being added at a mildly alkaline pH value to the enzyme solution and the enzyme-lignin complex then precipitated at a mild acidity. The lignin precipitation removes the enzyme from solution together with other protein and colloidal matter that may be present. The enzyme, however, may again be made active by dissolving the same in dilute alkali or at any pH value at which the enzyme is active and at which the enzyme-lignin complex is soluble. The proces is simple, inexpensive, and can be carried out with a high degree of efficiency with respect to enzyme recovery.

It has already been suggested to employ various lignins, including solubilized lignins, for the precipitation of various kinds of suspended matter, for example, sewage. However, so far as we are aware, it has not been known that enzymes can be precipitated with solubilized lignins and particularly with a specific type of solubilized lignin to which we shall refer more fully hereinbelow. Nor has it been known that enzymes can be precipitated with a lignin solution of such character and in such a way that the activity of the enzyme is not injured, and that the enzyme-lignin complex can be utilized in the same way as the enzyme itself has heretofore been employed without unfavorably affecting the hydrolytic or other process for which the enzyme is used, or the material on which it acts.

The term "lignin" is generally applied to a class of substances which constitute that part of the wood not directly extractable by solvents like alcohol or benzine, and not converted, like cellulose, into lower molecular weight carbohydrates by hydrolysis with mineral acids. The lignin which remains after the hydrolysis of the cellulose components of wood with strong mineral acids, is water-insoluble. It may, however, be converted into the water-soluble forms of lignin by chemical treatment, for example, by treatment with nitric acid to form nitro-lignin, or by halogenation.

Another solubilized form of lignin is obtained in the manufacture of cellulose from paper pulp, in which process lignin is solubilized while the insoluble cellulose is left behind. One of these processes involves digestion with bisulfite, whereby the lignin is converted into a crude form of lignosulfonic acid or its salts which are concentrated and sold commercially as sulfit waste liquor. Another form of water-soluble lignin is prepared by the so-called alkaline cook process in which wood is cooked with caustic soda. The dissolved lignin in the "black liquors" can be precipitated by neutralizing the alkali, for example, by passing carbon dioxide gas through the liquor (see, for example, E. B. Brookbank, Chemurgic Digest, June 30, 1943, "Recovery and uses of by-product soda lignin"), or by means of acids like sulfuric and hydrochloric.

It is the latter material which, after drying, represents the lignin matter employed in our invention. This lignin obtained by the alkaline cook process and in the form either of the acid-precipitated material which can be redissolved in dilute alkali, or in the form of the water-soluble alkali metal salt is, as we have found, capable of efficiently precipitating enzymes which are active at pH values above 5.0, the precipitate being in a form in which the enzyme retains its activity and on re-solution of the precipitate at the pH value at which the enzyme is most active, no loss of activity is apparent. We have found that other forms of lignin, including nitro-lignin, lignosulfonic acid, and various water-insoluble lignins are much less advantageous for the purposes of the present invention than the alkaline cook lignin.

As already indicated, the alkaline cook lignin which has been precipitated with carbon dioxide or acid, can be brought into solution with dilute alkali. It is generally best to use a minimum quantity of alkali, that is, only to the solubility point of the lignin, so as not to affect the pH of the enzyme extract more than necessary. In carrying out the process of the present invention, the alkali-soluble but acid-insoluble lignin prepared by the alkaline process outlined above, and dissolved at a slightly alkaline pH value, is added to the aqueous enzyme extract, and thereafter a suitable quantity of acid, either inorganic like sulfuric and hydrochloric, or a sufficiently strong organic acid like acetic, is added with thorough agitation so as to maintain uniformity of acidity throughout the solution. Formation of the insoluble complex begins to occur at approximately pH 5.0. A pH range of 4.0 to 4.5 is convenient for securing rapid and complete flocculation of the enzyme. It is important to keep careful check on the acidity because a low pH (as, for example, a pH value of 3.0) even for a brief period, may inactivate certain enzymes in the lignin complex so that it cannot be reconstituted to full activity. The minimum safe pH value will, however, differ for different enzymes and can be readily determined from the known properties of the enzyme in any particular case.

The enzyme lignin compound may be removed from solution by centrifugation or filtration or even by settling. The precipitated material may be conveniently dried by aerating the precipitate with dry air after spreading it out in thin layers. Prior to drying the precipitate it is advisable to adjust the pH slightly to the alkaline side as by the addition of small amounts of sodium bicarbonate or disodium phosphate. Such adjustment facilitates redissolving of the precipitate, and also prevents inactivation, as might occur if the acidified enzyme-lignin complex became too highly acid through concentration during the drying process. By the addition of small amounts of alkaline salts to the precipitate prior to drying, resolution may be carried out merely by the addition of water; otherwise, a somewhat alkaline solution is required. Drying may be speeded by mixing the precipitate with a small amount of a suitable carrier substance as, for example, anhydrous sodium sulfate or lactose. By the use of such a carrier, the dried product may be more readily removed from the drying surface. Lactose is particularly advantageous and appears to exercise an especially high protective action by preventing inactivation during drying. The dried material thus prepared is stable in respect to enzyme activity.

For ready solubility and reactivation of the enzyme-lignin, a slight alkalinity is generally required (pH 8.0–9.5). Where, however, the enzyme has a lower optimum pH activity, it is possible to adjust the pH after having redissolved the enzyme. The pH, however, cannot be lowered substantially below 5.0–5.5 because then the enzyme-lignin complex will reprecipitate.

The amount of lignin required for complete precipitation will depend upon the amount of precipitable matter in the enzyme extract. To achieve full precipitation it is advisable to add sufficient lignin to clarify the solution. Below this point, the amount of enzyme precipitated is in relation to the amount of lignin added. The amount required is best determined by preliminary experiment in each case.

Since heating of the solution will in most cases tend to inactivate the enzyme, it is desirable to maintain a temperature of about 30° C. or less.

Our process is suitable for the recovery of enzymes active at pH's within the range of pH 5.0 or higher (up to at least pH 11.0), that is, at ranges within which the enzyme-lignin complex is soluble. It would not be suitable for enzymes whose activity is restricted to conspicuously acid pH's, as, for example, pepsin. The method may be satisfactorily applied to such enzyme preparations as malt diastase, animal pancreas, mould trypsin, bacterial and mould amylases, etc., having an optimum activity within the range cited.

The following examples describe more in detail and by way of illustration satisfactory procedures for carrying out the invention:

*Example 1*

An Aspergillus mould forming a tryptic enzyme is grown on bran. After the beginning of spore formation, 180 grams of the bran are extracted by shaking with one liter of water in the presence of 0.5% toluol for one hour.

A 10% solution of lignin prepared by the alkaline cook process and dissolved in N/10 NaOH, is added slowly with stirring to the mould extract, 10 cc. being added per liter. The pH value of the mixture is 8.2. Dilute sulfuric acid is added to the mixture with agitation until the pH reaches the vicinity of 4.0. A rich precipitate is formed which includes the lignin-enzyme complex, and is dark brown in color. The precipitate from one liter is readily removed by centrifugation, which produces a clear supernatant, and is then mixed with 2.5 g. NaHCO3 and 5 g. lactose and spread on a glass plate and dried in a current of air.

The dried precipitate redissolves readily in water and has a pH of 9.0 when restored to its original volume prior to the precipitation. A tryptic test by M. L. Anson's hemoglobin method (J. Gen. Physiol. 22:79 (1938)) reveals that more than 90% of the original tryptical power of the bran extract is retained in the reconstituted solution.

*Example 2*

An infusion of malt diastase is prepared by extraction of 25 gms. of ground malt with 500 cc. of water. 400 cc. of the solution are precipitated by adding 2 cc. of 10% lignin solution in N/10 NaOH and adjusting the pH to 4.0 by the dropwise addition of 5% sulfuric acid to the solution with agitation. The centrifuged precipitate is dried with the addition of 0.5 gm. sodium bicarbonate and 1 gm. sodium sulfate in a current of air. The dried precipitate is redissolved in water and the pH adjusted to 5.5 by adding dilute sulfuric acid dropwise to the agitated solution. A test for beta-amylase by the Lintner tube series method reveals that 85% of the original activity is present in the reconstituted solution.

We claim:

1. The method of claim 11 applied to an enzyme derived from microorganisms.
2. The method of claim 11 applied to animal pancreas.
3. The method of claim 11 applied to malt diastase.
4. The method of claim 11 applied to amylase derived from microorganisms.
5. The method of claim 11 in which the precipitated complex is separated from the solution and dried.
6. The method of claim 11 in which the precipitated complex is separated from the solution and dried, and thereafter is redissolved in dilute alkali at a pH between 7.5 and 11.0.
7. The method of claim 11 in which the precipitated complex is separated from the solution and dried, and thereafter is redissolved in dilute alkali at a pH between 7.5 and 11.0, and the enzyme solution then adjusted to a pH value within the range of 5.0 to 7.5 corresponding to the optimum activity of the enzyme.
8. The method of claim 11 in which both the dissolved lignin and an acid are added slowly to the enzyme extract with thorough agitation.
9. In a process for the enzymatic treatment of materials, the step which comprises acting on the material with a solution of an enzyme-lignin complex at a pH value at which the enzyme is active and soluble.
10. In a process for the enzymatic treatment of materials, the step which comprises acting on the material with a solution of an enzyme-lignin complex at a pH value at which the enzyme is active, but no lower than 5.0.
11. The method of removing and recovering from aqueous solutions an enzyme active within the range of pH 5 to 11, which comprises precipitating the enzyme by means of a water-soluble alkali cook lignin from a solution having a pH value below 5 but not substantially below 4 so as to form a complex insoluble at such pH value but soluble at a pH value of about 5.0 and higher.

JAMES S. WALLERSTEIN.
RALPH THOMAS ALBA.

REFERENCES CITED

The following references are of record in the file of this patent:

UNITED STATES PATENTS

| Number | Name | Date |
| --- | --- | --- |
| 695,254 | Weber | Mar. 11, 1902 |
| 1,866,633 | Ehrenreich | July 12, 1932 |
| 2,284,593 | Seidel | May 26, 1942 |
| 2,351,413 | Farber | June 13, 1944 |

OTHER REFERENCES

Chemical Abstracts, 27:5130 (9), taken from Soil Science, 36, Waksman & Iyer (1933), pp. 69–82. Note page 70.

Sumner and Somers: Enzymes, Academic Press, Inc., publishers, New York, N. Y., 1943, page 7.

Martha Morrow: "Lignin put to work," Science News Letter for Nov. 4, 1944, page 298.